(No Model.)
2 Sheets—Sheet 2.
G. N. TODD.
COTTON HARVESTER.
No. 423,885.
Patented Mar. 18, 1890.
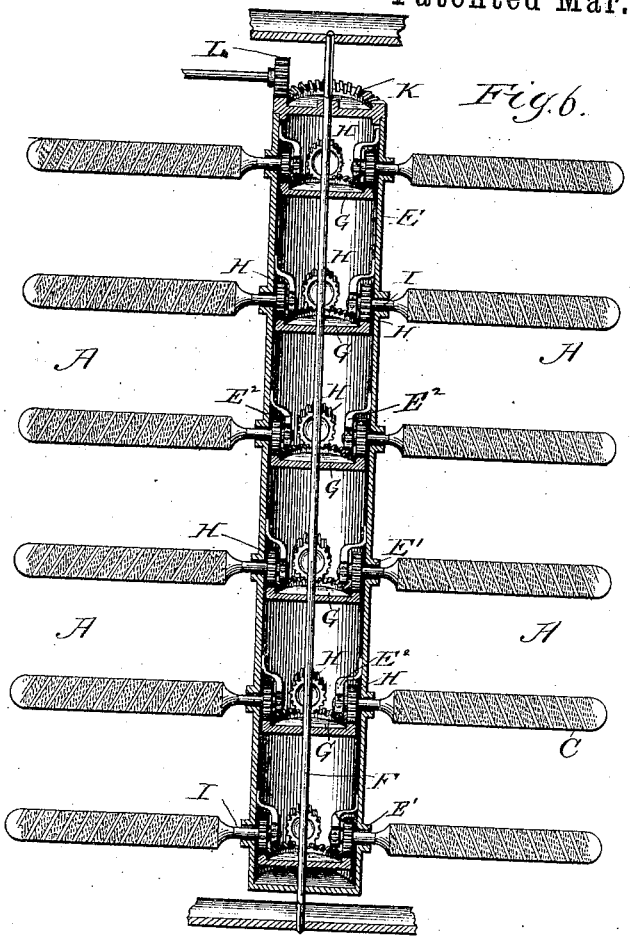
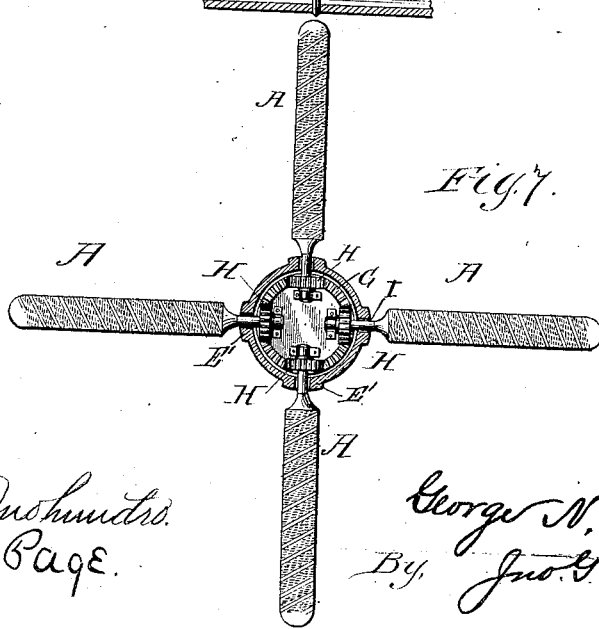
Witnesses.
Will C. Anohundro.
Chas. G. Page.
Inventor.
George N. Todd.
By Jno. G. Elliott
Atty.

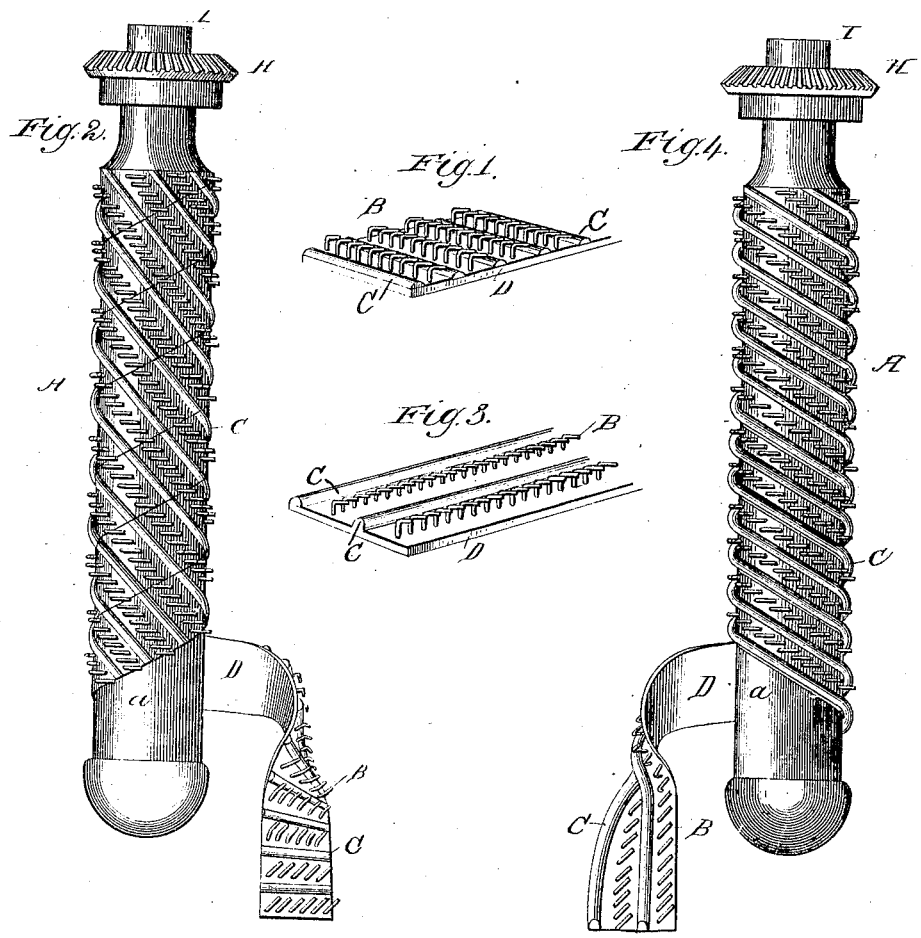

UNITED STATES PATENT OFFICE.

GEORGE N. TODD, OF NEW YORK, N. Y., ASSIGNOR TO THE TODD COTTON HARVESTER COMPANY, OF ILLINOIS.

COTTON-HARVESTER.

SPECIFICATION forming part of Letters Patent No. 423,885, dated March 18, 1890.

Application filed September 25, 1884. Serial No. 143,953. (No model.)

*To all whom it may concern:*

Be it known that I, GEORGE N. TODD, a citizen of the United States, residing in New York, county of New York, and State of New York, have invented certain new and useful Improvements in Cotton-Harvesters, of which the following is a specification.

Prior to my invention, picker-stems for cotton-harvesters of that class in which one or more sets of axially-rotating picker-stems are thrust between the branches of the plants in order to pick the cotton therefrom have been provided with picker-teeth secured in the body of the stem within spaces formed between projections serving as guards for warding off the branches of the plants from the teeth, and in an application which I have filed of even date herewith, Serial No. 143,952, for Letters Patent of the United States, I have set forth a rotary picker provided with toothed straps passing between the guards of a rotary picker more especially adapted for a cotton-harvester in which one or more large rotary pickers are employed.

In my said application I have shown the guards made separate from the straps and of an approximately elliptical form, so as to take up the space occurring where a continuous strap is wound around a bent or curved cylinder or tube, and I also show in said application a picker having a continuous spiral guard with a toothed belt wound between the spirals.

The difficulty of setting the teeth in the body of the stem so that the ends of the teeth shall all have a uniform relation to the height of the guard, and the labor of securing the teeth, is considerable, and attended with other objectionable features, such as expense, time, skill, and the like.

The object of my present invention is to obviate the objectionable features attending the setting of the teeth in the body of the picker-stem, and to provide the strap itself with guards or ribs prior to its application to the body of the stem, whereby when the strap is wound about the straight cylindrical body of the stem the ribs or ledges on the strap shall form guards alternating with the toothed spaces. This feature is evidently more especially applicable to a straight cylindrical body, since a strap can be wound thereon so as to cover the entire face of the cylinder, and obviously by arranging the ribs on the strap or band with regard to the width of the strap, the size of the cylinder, and the desired number of guards or their distances apart, a variety of forms of guards can be produced, but prior to the application of the strap were either formed integral with or made separate and then secured to the strap.

Another object of this invention is to impart to the picker-stems a continuous individual axial rotation during their bodily travel about the axis of their support, whereby the cotton with which the stems come in contact will be engaged by and wound upon the stems with sufficient security to prevent an accidental dropping thereof until removed by suitable cleaner devices, which form no part of this invention, and, finally, to provide certain details of construction of novel and efficient character for the carrying out of my invention, all as illustrated in the drawings, in which—

Figure 1 represents a portion of a strap provided with picker-teeth and guards in accordance with my invention. Fig. 2 illustrates a strap of such character wound about the straight cylindrical body of a picker-stem with one end of the strap shown unwound. Fig. 3 represents a portion of a toothed strap provided with guards arranged somewhat differently from the guards shown in Fig. 1. Fig. 4 illustrates a strap such as shown in Fig. 3 applied to the straight cylinder of a picker-stem. Fig. 5 illustrates several forms of guards. Fig. 6 is designed to illustrate one of several ways in which the picker-stems can be operated, and is a longitudinal section through a rotary cylinder supporting the picker-stems and combined with mechanisms suitable for operating the stem. Fig. 7 represents a section taken transversely through Fig. 6.

The picker-stems A consist each of a straight cylindrical or equivalent shaped body portion *a*, provided with a facing of picker-teeth B and guards C, rising to about a level with the outer acting ends of the picker-teeth. The picker-teeth are set in a bed or backing formed of a band or strap D, of metal, leather, or other suitable flexible material, but preferably of leather, and the guards C are formed with the band or strap or made separate from and secured to the band or strap so as to be practically integral with the same. The guards, which are in the nature of ribs upon the band or strap, can be made of a variety of shapes in cross-section—as, for example, they can be made cylindrical, square, or triangular, as shown in Figs. 5, in which these several varieties of shapes of guards are illustrated. These guards can be arranged either transversely to the length of the strap or band, as in Fig. 1, or longitudinally thereon and parallel with the length of the band or strap, as in Fig. 3, in either of which cases the guards will lie in a spiral line on the stem when the strap or band is wound on the cylindrical body of the same. Thus where a strap is provided with longitudinal guards, as in Fig. 3, and wound spirally on the body of the stem, the guards will obviously run spirally on the stem from end to end thereof, the teeth secured in the strap between its longitudinal guard being under such arrangement situated in a space running spirally along the stem. The same result will be attained by providing the strap with a series of short transverse guards, as in Fig. 1, since when such strap is wound spirally about the body of the picker-stem the transverse ribs will form guards running in spiral lines along the picker-stem, substantially from end to end thereof, as in Fig. 2. By Fig. 4 it will be seen that practically the same result is attained by the longitudinal ribs on the strap, the spiral being in this instance more gradual than in the others. But in these or in other forms in which the guards can be arranged upon the strap or band the result of a band provided with guards and wound about the body of the stem is preserved, whereby the band or strap can be manufactured or provided with guards and teeth prior to its application to the body of the stem, and hence a considerable length of the toothed strap provided with guards can be readily and economically made. It will also be evident that by thus providing a band or strap with guards and afterward applying the same to the body of a picker-stem the relative position of the ends of the teeth to the highest portion of the guards can be determined before the application of the teeth and guards to the stem.

In Figs. 6 and 7 is shown mechanism for operating the picker-stems, which mechanism consists of a rotary cylinder E for supporting several series of picker-stems radiating from the cylinder, and each mounted so as to be susceptible of rotating about its own axis while it is being carried round with the cylinder. The cylinder is arranged to rotate about a fixed axis or axle F, and containing a series of annular gears G, fixed at intervals on the stationary shaft F. Under the arrangemen shown four radially-arranged rotary picker-stems are operated from each one of the gears G, for which purpose each picker-stem is provided with a gear H, fixed upon an axle I of the picker-stem and engaging one of the gears G within the cylinder. The axles of the picker-stems have their bearings in short necks E', formed on the cylinder at the points where the axles pass through the same, and also in bearings $E^2$, secured on the inner side of the cylinder, in which way I provide a pair of bearings for the axle of each picker-stem and arrange the gear on said axle at a point between the two bearings. In this way when the cylinder is rotated about its axis the gears on the picker-stems traveling on the stationary gears G will necessarily turn, and hence cause an axial rotation of the picker-stems.

The rotary cylinder is provided at one end with a gear K, engaged by a pinion L on a driving-shaft, which latter can be operated by any suitable gearing or equivalent connection between said shaft and the wheel of a cotton-harvester. The position of the cylinder may be varied—as, for example, it can be vertical, inclined, or horizontal, as may be found most desirable.

Having described my invention, what I claim, and desire to secure by Letters Patent, is—

1. A facing for a rotary picker, consisting of a toothed strap or band provided with guards, substantially as described.

2. A facing for a rotary picker, consisting of a toothed strap provided with guards formed integral with the strap, substantially as described.

3. The body of a picker-stem, in combination with a spirally-wound strap provided with picker-teeth and ribs, which latter constitute guards, substantially as and for the purpose described.

4. A rotary picker-stem provided with an acting face composed of a strap provided with ribs and picker-teeth and wound about the body of the stem, so as to bring the ribs in position to form spiral guards, substantially as described.

5. The rotary cylinder, the fixed shaft, and the annular gears rigid on said shaft, in combination with the picker-stems extending radially from and bearing in the cylinder, and gears on said stems meshing with the annular gears, substantially as described.

GEORGE N. TODD.

Witnesses:
W. W. ELLIOTT,
JNO. G. ELLIOTT.